(12) United States Patent
Keum et al.

(10) Patent No.: US 8,661,473 B2
(45) Date of Patent: Feb. 25, 2014

(54) APPARATUS AND METHOD FOR PROVIDING CONTENTS IN INTERNET BROADCASTING SYSTEM

(75) Inventors: Ji-Eun Keum, Suwon-si (KR); Bo-Sun Jung, Seongnam-si (KR); Jun-Hyung Kim, Suwon-si (KR); Young-Wan So, Gunpo-si (KR); Jong-Hyo Lee, Pyeongtaek-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 470 days.

(21) Appl. No.: 12/410,139

(22) Filed: Mar. 24, 2009

(65) Prior Publication Data

US 2009/0249403 A1    Oct. 1, 2009

(30) Foreign Application Priority Data

Mar. 28, 2008   (KR) .................. 10-2008-0029264
Jan. 29, 2009   (KR) .................. 10-2009-0007165

(51) Int. Cl.
*H04N 5/445*   (2011.01)

(52) U.S. Cl.
USPC .................. 725/53; 725/46; 725/47; 725/50

(58) Field of Classification Search
USPC ..................................... 725/53, 46, 47, 50
See application file for complete search history.

(56) References Cited

U.S. PATENT DOCUMENTS

| | | | | |
|---|---|---|---|---|
| 6,486,920 | B2 * | 11/2002 | Arai et al. ..................... | 348/563 |
| 2002/0009283 | A1 | 1/2002 | Ichioka et al. | |
| 2002/0116709 | A1 * | 8/2002 | Sakamoto et al. .............. | 725/41 |
| 2002/0116713 | A1 | 8/2002 | Mukai et al. | |
| 2002/0147977 | A1 | 10/2002 | Hammett et al. | |
| 2003/0115602 | A1 * | 6/2003 | Knee et al. ...................... | 725/42 |
| 2004/0101271 | A1 * | 5/2004 | Boston et al. ................... | 386/46 |
| 2004/0117829 | A1 | 6/2004 | Karaoguz et al. | |
| 2005/0132420 | A1 * | 6/2005 | Howard et al. ............... | 725/135 |
| 2005/0183120 | A1 | 8/2005 | Jain et al. | |
| 2006/0051059 | A1 * | 3/2006 | Krakirian et al. ............... | 386/83 |
| 2006/0174269 | A1 * | 8/2006 | Hansen-Turton ............... | 725/39 |
| 2006/0248572 | A1 * | 11/2006 | Kitsukama et al. ........... | 725/135 |
| 2007/0074245 | A1 * | 3/2007 | Nyako et al. .................... | 725/34 |
| 2007/0162945 | A1 * | 7/2007 | Mills ............................. | 725/119 |
| 2007/0204299 | A1 * | 8/2007 | Vosseller ........................ | 725/46 |
| 2008/0271078 | A1 * | 10/2008 | Gossweiler et al. ............ | 725/40 |
| 2008/0276284 | A1 * | 11/2008 | Bumgardner et al. .......... | 725/58 |
| 2009/0228926 | A1 * | 9/2009 | Van De Sluis et al. ......... | 725/39 |
| 2009/0228942 | A1 * | 9/2009 | Brelivet et al. ............... | 725/109 |
| 2010/0257561 | A1 * | 10/2010 | Maissel et al. .................. | 725/41 |

FOREIGN PATENT DOCUMENTS

| | | |
|---|---|---|
| EP | 1 879 391 A1 | 1/2008 |
| KR | 10-2005-0073266 A | 7/2005 |
| KR | 10-2006-0083523 A | 7/2006 |
| KR | 10-2006-0083524 A | 7/2006 |
| KR | 10-2007-0063126 A | 6/2007 |
| WO | 2007/099481 A1 | 9/2007 |
| WO | 2008/005656 A2 | 1/2008 |

* cited by examiner

*Primary Examiner* — Kieu Oanh T Bui
(74) *Attorney, Agent, or Firm* — Jefferson IP Law, LLP

(57) ABSTRACT

An Internet broadcasting system for supporting broadcast services by using Internet Protocol (IP), and more particularly an apparatus and method for providing a user's preferred contents in an Internet broadcasting system are provided. The method of providing contents in an Internet broadcasting system includes searching for contents in an Electronic Program Guide (EPG) according to a user preference, constituting a user channel, based on the searched contents and providing a terminal with the searched contents according to the user channel.

24 Claims, 12 Drawing Sheets

APPARATUS AND METHOD FOR PROVIDING CONTENTS IN INTERNET BROADCASTING SYSTEM

PRIORITY

This application claims the benefit under 35 U.S.C. §119(a) of Korean patent applications filed in the Korean Industrial Property Office on Mar. 28, 2008 and Jan. 29, 2009, and assigned Serial Nos. 10-2008-0029264 and 10-2009-0007165 respectively, the entire disclosure of both of which are hereby incorporated by reference.

BACKGROUND OF THE INVENTION

1. Field of the Invention

The present invention relates to an Internet broadcasting system for supporting broadcast services. More particularly, the present invention relates to an apparatus and method for providing a user's preferred contents in an Internet broadcasting system.

2. Description of the Related Art

In the Internet Protocol (IP)-based convergence era, the convergence of communications and broadcasting, which is a new marketable next-generation business model, is attracting attention as a next-generation market-leading technology. In particular, IP Tele-Vision (IPTV) technology, a major hub of the communications-broadcasting convergence services, is a technology that can create various business models and services by not only providing a service bundle in which the existing TV, voice, and data technology are recombined or combined into one service, but also by supporting bidirectionality. Notably, the IPTV technology does not provide services specified in the existing limited terminal environment, but provides services regardless of service receivers including a fixed terminal (e.g. set-top box, Personal Computer (PC), TV, etc.), a mobile terminal (e.g. cellular phone, Personal Digital Assistance (PDA), etc.), and a network, thereby making it possible to not only provide and apply the same services in various environments, but also develop various types of services by taking account of various environments.

FIG. 1 illustrates a conventional IPTV-related whole domain and value chain.

Referring to FIG. 1, the IPTV-related whole domain includes a consumer domain 1 101, a network provider domain 1102, a platform provider domain 1103, an IPTV service provider domain 1104, and a contents provider domain 1105 in order to provide a user 1100 with IPTV.

The consumer domain 1101 is a domain for consuming IPTV services, and may be implemented by a network (e.g. home network) including a one or more terminals for reception and use of the services and many other terminals. Examples of the terminal may include not only a set-top box, but also a portable terminal supporting the wireless environment, such as a cellular phone and a PDA.

The network provider domain 1102 connects the user 1100 with platform or service providers, and serves to deliver various types of services and contents. A transmission system of the network provider domain 1102 may support various transmission technologies, such as wired/wireless transmission and broadcasting, and usually includes an access network and a core or backbone network.

The platform provider domain 1103 is a domain for providing services common to IPTV service providers, and provides the IPTV service providers with authentication, charging, etc.

The IPTV service provider domain 1104 is a domain for providing the consumer domain 1101 with IPTV services, and provides the IPTV services by receiving contents from contents providers and packaging them into services.

The content provider domain 1105 is a domain that owns contents or content property and the copyright thereon.

It is possible to provide various IPTV services, as well as content services and content on-demand services scheduled within the above-mentioned five domains, and four major roles for this service provision are gathered to form one value chain.

First, a content production unit 1109 is located in the content provider domain 1105, and serves to produce and edit contents. A content aggregation unit 1108 is located in the IPTV service provider domain 1104, and serves to receive contents from various content providers and constitute various services. A content delivery unit 1107 is located in the platform provider domain 1103 and the network provider domain 1102, and serves to deliver aggregated contents, provided from IPTV service providers, to the consumer domain 1101. Finally, a content reconstitution unit 1106 is located in the consumer domain 1101, and serves to convert provided contents into a format viewable by the user 1100 and provide the user 1101 with the converted content.

IPTV services are largely classified into two types, that is, a managed model and an unmanaged model (open Internet), according to whether they provide Quality of Service (QoS). The managed model is a type in which a service provider integrally manages the platform provider domain 1103, the network provider domain 1102, and the IPTV service provider domain 1104. The unmanaged model is a type in which a service provider may be separated from a network provider in such a manner that the service provider belonging to the IPTV service provider domain 1104 transmits to another network provider (the network provider domain 1102 and the platform provider domain 1103).

FIG. 2 illustrates a conventional method of providing contents.

A service provider 1201 may be described separately for the managed model and the unmanaged model. In the case of the unmanaged model, the role of a network provider exists, but is not illustrated in FIG. 2 for the convenience of explanation. However, the role of the network provider will be mentioned in the following description.

A content provider 1200 generates contents and detailed information on the contents (hereinafter referred to as "content information") in step 1204, and delivers the generated contents and content information to the service provider 1201 in step 1205.

On receiving the contents and content information, in step 1206, the service provider 1201 generates an Electronic Program Guide (EPG) through the delivered contents and content information. Herein, the EPG provides detailed information on services and contents provided by the service provider 1201, a method of purchasing them, a method for accessing them, etc.

In step 1207, the service provider 1201 delivers the EPG to a set-top box 1202. In step 1208, the set-top box 1202 receives the delivered EPG, processes the corresponding EPG, and provides a TV (Display) 1203 with processed information. The TV (Display) 1203 displays the EPG according to the provided processed information.

In step 1209, the user 1100 selects desired contents through the EPG displayed on the TV (Display) 1203. In step 1210, the user 1100 delivers a request message for reception of the selected contents to the service provider 1202 through the set-top box 1202.

In step 1212, the selected contents are delivered to the user 1100. With regard to this, the contents may be provided in various ways according to service policies. For example, contents stored in the service provider 1201 or contents received from the content provider 1200 may be delivered, and a transmission scheme and a content type may also be in various forms, such as streaming/downloading, real-time/non real time, etc. In step 1213, the contents received in this way are displayed to the user 1100 through the TV (Display).

As mentioned above, when it is possible for an Internet broadcasting system to support a large number of channels by using an Internet network, a user has difficulty in searching for a desired channel, and must spend time on channel tuning. Therefore, there is a need for an apparatus and method to provide a user with his/her desired contents in a manner in which the user does not need to search for and tune channels to find desired contents.

SUMMARY OF THE INVENTION

An aspect of the present invention is to address at least the above-mentioned problems and/or disadvantages and to provide at least the advantages described below. Accordingly, an aspect of the present invention is to provide an apparatus and method for providing a user's preferred contents in an Internet broadcasting system.

Another aspect of the present invention is to provide an apparatus and method for providing a user with his/her preferred contents through the user's own channel (hereinafter referred to as a "user channel") without requiring the user to change a channel.

In accordance with an aspect of the present invention, a method of providing contents in an Internet broadcasting system is provided. The method includes searching for contents in an Electronic Program Guide (EPG) according to a user preference, constituting a user channel, based on the searched contents and providing a terminal with the searched contents according to the user channel.

In accordance with another aspect of the present invention, an apparatus for providing contents in an Internet broadcasting system is provided. The apparatus includes a content search unit for searching for contents in an Electronic Program Guide (EPG) according to a user preference and a user channel constitution unit for constituting a user channel, based on the searched contents, and for providing a terminal with the searched contents according to the user channel.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, exemplary embodiments for achieving the above-mentioned technical problems will be given. Also, for the convenience of explanation of the present invention, the same entity names as those defined by the 3$^{rd}$ Generation Partnership Project (3GPP) that is an asynchronous mobile communication standards body or by the Open IPTV Forum (OIF) that is an Internet protocol TV standards organization will be used. However, the scope of the present invention is not limited to such standards and names, and it is obvious that the present invention can be applied to systems whose backgrounds are similar.

Figure 1:
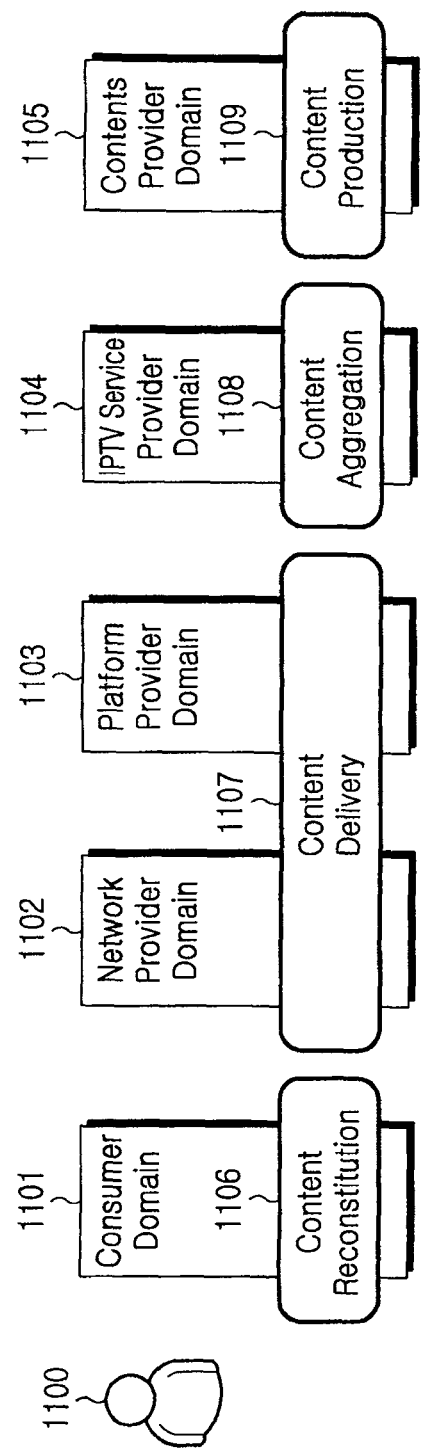
FIG. 1 is a view illustrating a conventional Internet Protocol Tele-Vision (IPTV) related whole domain and value chain.
Figure 2:
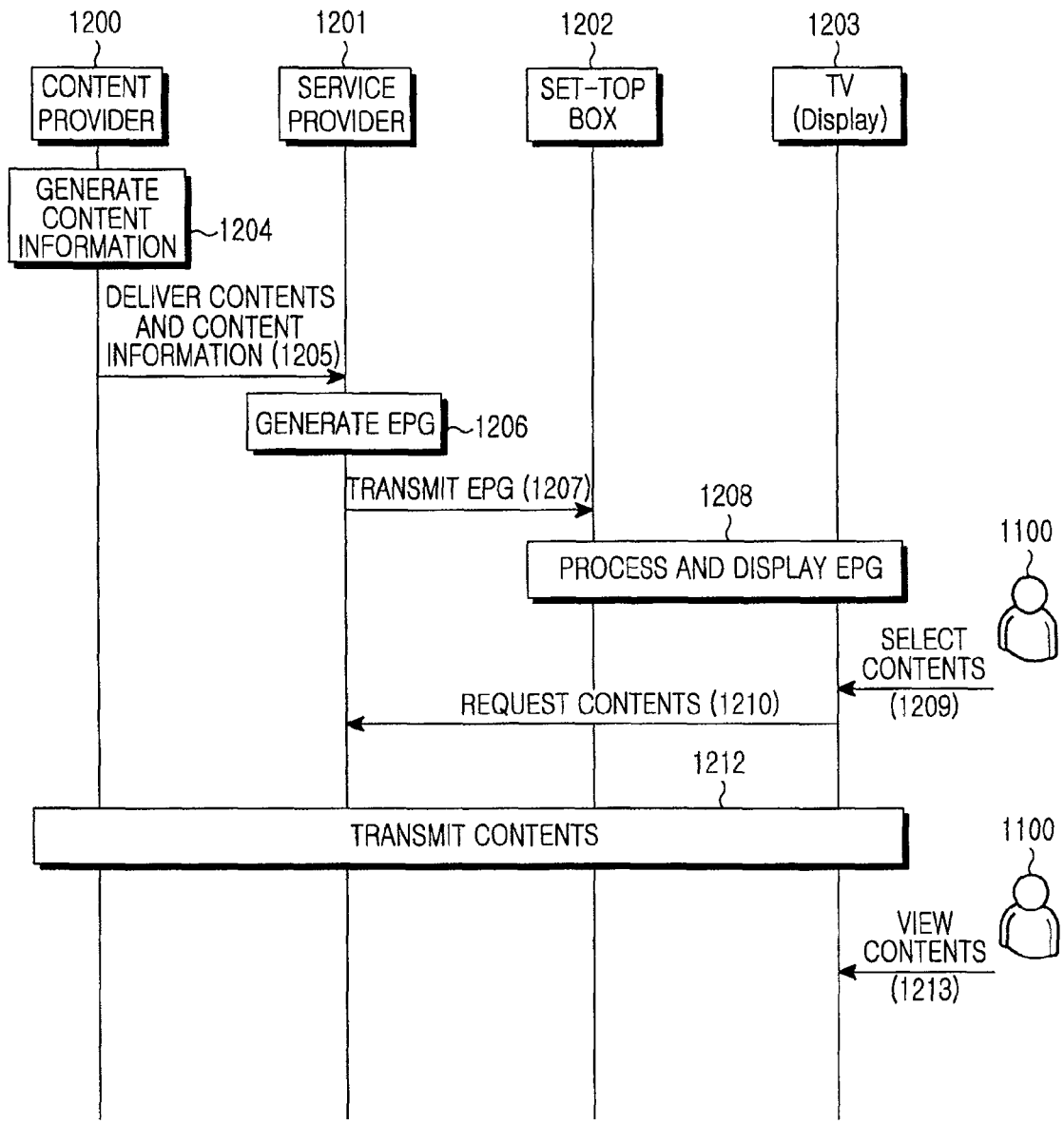
FIG. 2 is a flowchart illustrating a conventional method of providing contents.
Figure 3A:
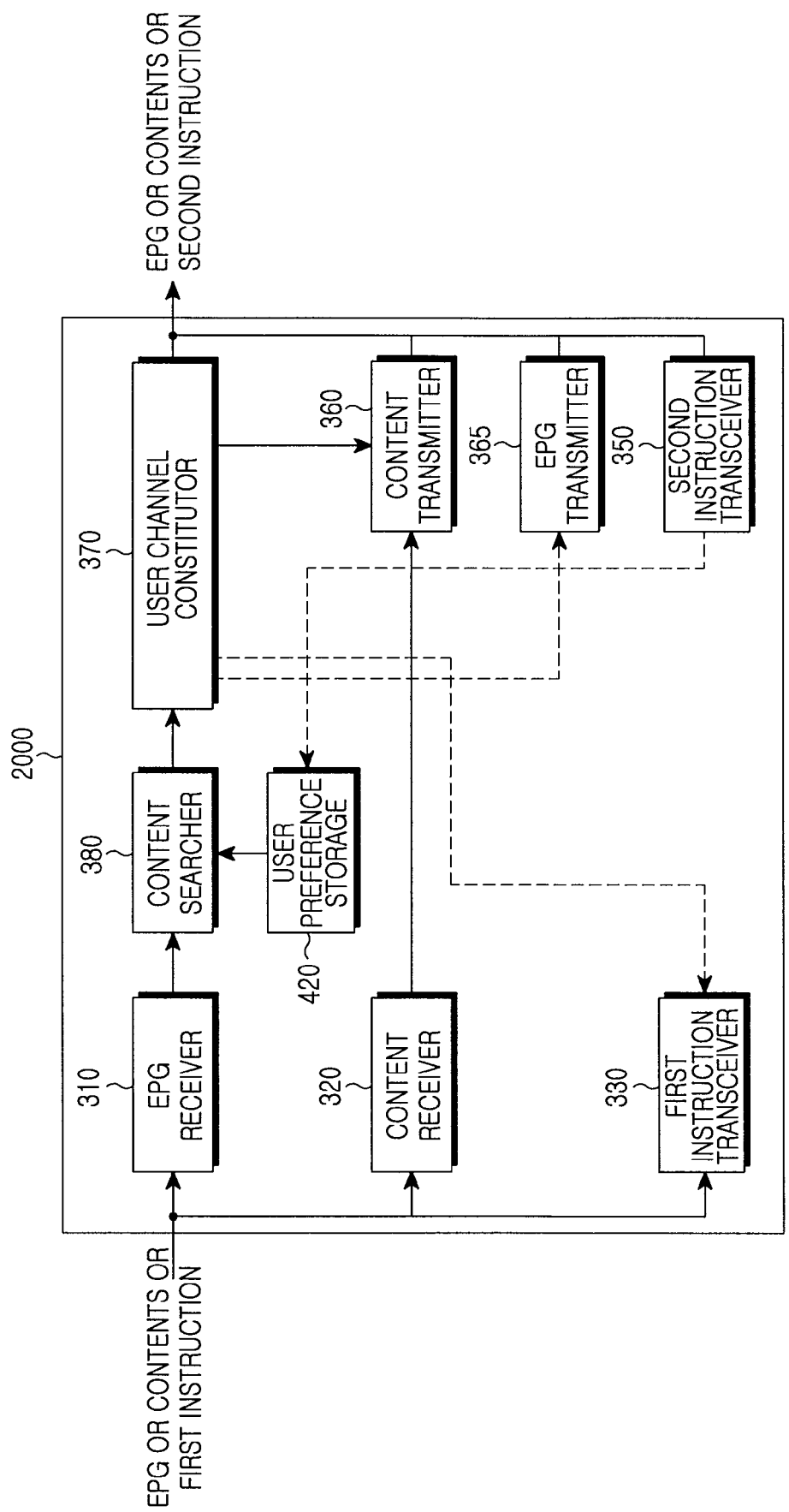
FIG. 3A is a block diagram illustrating an apparatus for providing contents in accordance with an exemplary embodiment of the present invention.
Figure 3B:
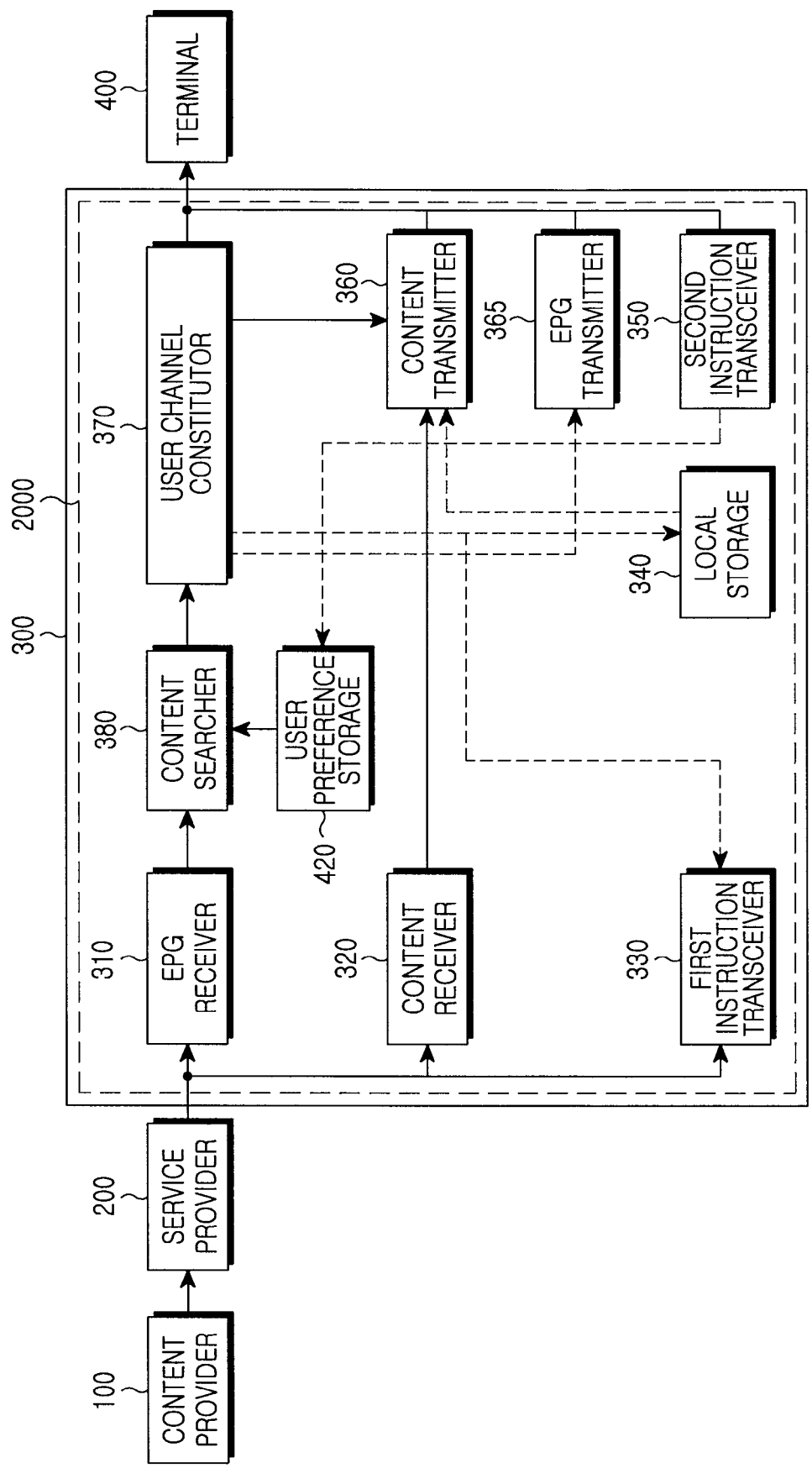
FIG. 3B is a block diagram illustrating a case where a content providing apparatus according to an exemplary embodiment of the present invention is located in a set-top box.

FIG. 3A illustrates an apparatus for providing contents according to an exemplary embodiment of the present invention, and FIG. 3B illustrates a case where the apparatus is located in a set-top box.

Referring to FIG. 3A, the apparatus 2000 for providing contents includes functions constituting respective logical objects and respective objects in an Internet Protocol Television (IPTV) apparatus. The structure of the content providing apparatus 2000 of FIG. 3A will be described below together with the structure of the set-top box 300 of FIG. 3B.

Referring to FIG. 3B, a content provider 100 includes a main body for providing a service provider 200 with IPTV-related contents, and may be a broadcasting station or a user (because a user may create and provide contents in person). The contents provided by the content provider 100 may be divided into two types; contents scheduled according to a time schedule transmitted in real time, and contents transmitted at the request of a user regardless of time.

The service provider 200 includes a main body for managing IPTV services and providing them to a user. The service provider 200 may simply retransmit contents, received from the content provider 100, without processing them, or may manipulate contents and transmit the manipulated contents to a terminal 400 at the request of a user or for the profit of the service provider 200.

The set-top box 300 is an initial access apparatus of a user network that receives IPTV services, and serves to manage a home terminal 400 which may include wireless terminals, and to transmit contents to the terminal 400.

The user terminal 400 refers to a terminal through which a user directly uses IPTV services, and includes a wireless terminal, a conventional TV set, a Digital Living Network Alliance (DLNA) device, etc. Also, the terminal 400 may represent a plurality of terminals.

According to this exemplary embodiment, the set-top box 300 is implemented by adding logical objects for performing specific functions at a conventional set-top box that serves to retransmit real-time contents.

The content providing apparatus 2000 of FIG. 3A, constituted in the set-top box 300, includes an Electronic Program Guide (EPG) receiver 310, a content receiver 320, a first instruction transceiver 330, a local storage 340 for Private Video Recording (PVR), a second instruction transceiver 350, a content transmitter 360, a user channel constitutor 370, a content searcher 380, a user preference storage 420, and an EPG transmitter 365. The logical objects of FIG. 3 are given only according to one exemplary embodiment of the present invention, and do not limit the scope of the present invention. For example, the local storage 340 is included in FIG. 3B and not FIG. 3A to illustrate that the local storage 340 is part of the set-top box 300. However, this is merely for example and the local storage 340 may also be part of the content providing apparatus 2000.

Figures 4, 5:
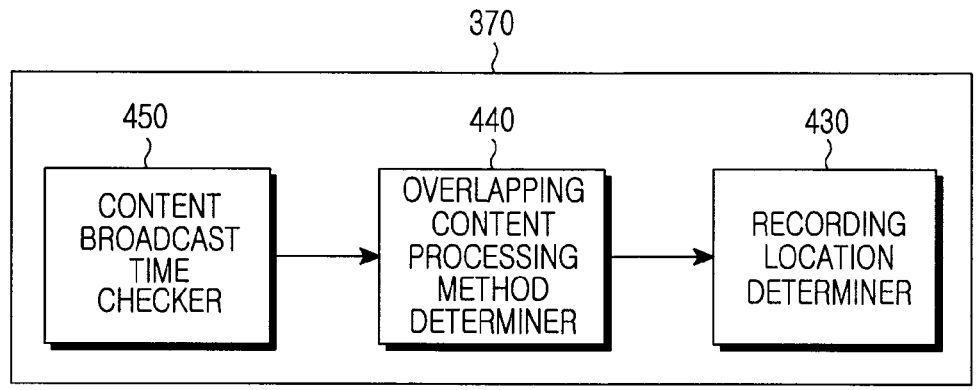
FIG. 4 is a block diagram illustrating a user channel constitutor unit according to an exemplary embodiment of the present invention.
FIG. 5 is a view illustrating an Electronic Program Guide (EPG) according to an exemplary embodiment of the present invention.

The EPG receiver 310 receives an EPG provided by the service provider for IPTV services, and delivers the received EPG to the content searcher 380. Herein, the EPG refers to a program guide including information on contents provided for IPTV services. For example, the EPG includes tag information indicating channel names, program names, watching time, genres, attributes, etc. As an example, the EPG is implemented as given in FIG. 5. FIG. 5 illustrates an exemplary EPG 510.

The content searcher 380 searches for at least one content, based on a user preference contained in the user preference storage 420, by using the EPG, and delivers the searched content to the user channel constitutor 370.

The user channel constitutor 370 constitutes the delivered content into one user channel. With regard to this, when broadcast content overlaps, the user channel constitutor 370 transmit a non Private Video Recording (nPVR) instruction to the first instruction transceiver 330 or delivers a PVR instruction to the local storage 340 in order to record content with low user preference.

Also, the user channel constitutor 370 sends a signal to the content transmitter 360 to transmit the content according to the constituted channel. The local storage 340 stores the delivered content in a home storage device. The content stored in the local storage 340 includes content for which the user channel constitutor 370 delivers a PVR instruction to the local storage 340.

The content transmitter 360 transmits content to the terminal 400 according to the constituted user channel. The content receiver 320 receives content from the service provider 200, and transmits the received content to the content transmitter 360.

The first instruction transceiver 330 transmits/receives an instruction between the service provider 200 and the set-top box 300. More particularly, the first instruction transceiver 330 transmits/receives an instruction regarding an nPVR request to/from the service provider 200 according to an exemplary embodiment of the present invention.

The second instruction transceiver 350 transmits/receives an instruction to/from the terminal 400, and may transmit a request for user preference information and receive the user preference information according to an exemplary embodiment of the present invention.

The user preference storage 420 is a block for storing a user's content consumption behavior. The content consumption behavior may be input directly by the user or may be analyzed and stored by the set-top box 300. The EPG transmitter 365 receives a reconstituted EPG from the user channel constitutor 370, and transmits the EPG to the terminal 400.

FIG. 4 is a block diagram illustrating a user channel constitutor according to an exemplary embodiment of the present invention.

Referring to FIG. 4, the user channel constitutor 370 includes a recording location determiner 430, an overlapping content processing method determiner 440, and a content broadcast time checker 450, which function together as a unit for processing overlapping contents.

The content broadcast time checker 450 identifies the broadcast time of content delivered from the content searcher 380, and determines if the broadcast time overlaps with that of other content.

The overlapping content processing method determiner 440 determines a method of processing content, the broadcast time of which overlaps with that of other content. For example, the overlapping content processing method determiner 440 records an overlapping part of the overlapping content by using the PVR or nPVR function, and then transmits the recorded part when content previously viewed by a user ends.

The recording location determiner 430 includes a block for determining a recording location of the content, the broadcast time of which overlaps with that of other content, and determines whether the overlapping content is subjected to PVR in the local storage 340 within the set-top box 300 or is subjected to nPVR in a storage on the network of the service provider 200. With regard to this, the recording location determiner 430 may determine a recording location in consideration of a difference between the starting and ending times of contents, the capacity of the local storage 340, a network bandwidth, and the like. Various other parameters may also be considered depending on the service environment and policy.

Figure 6:
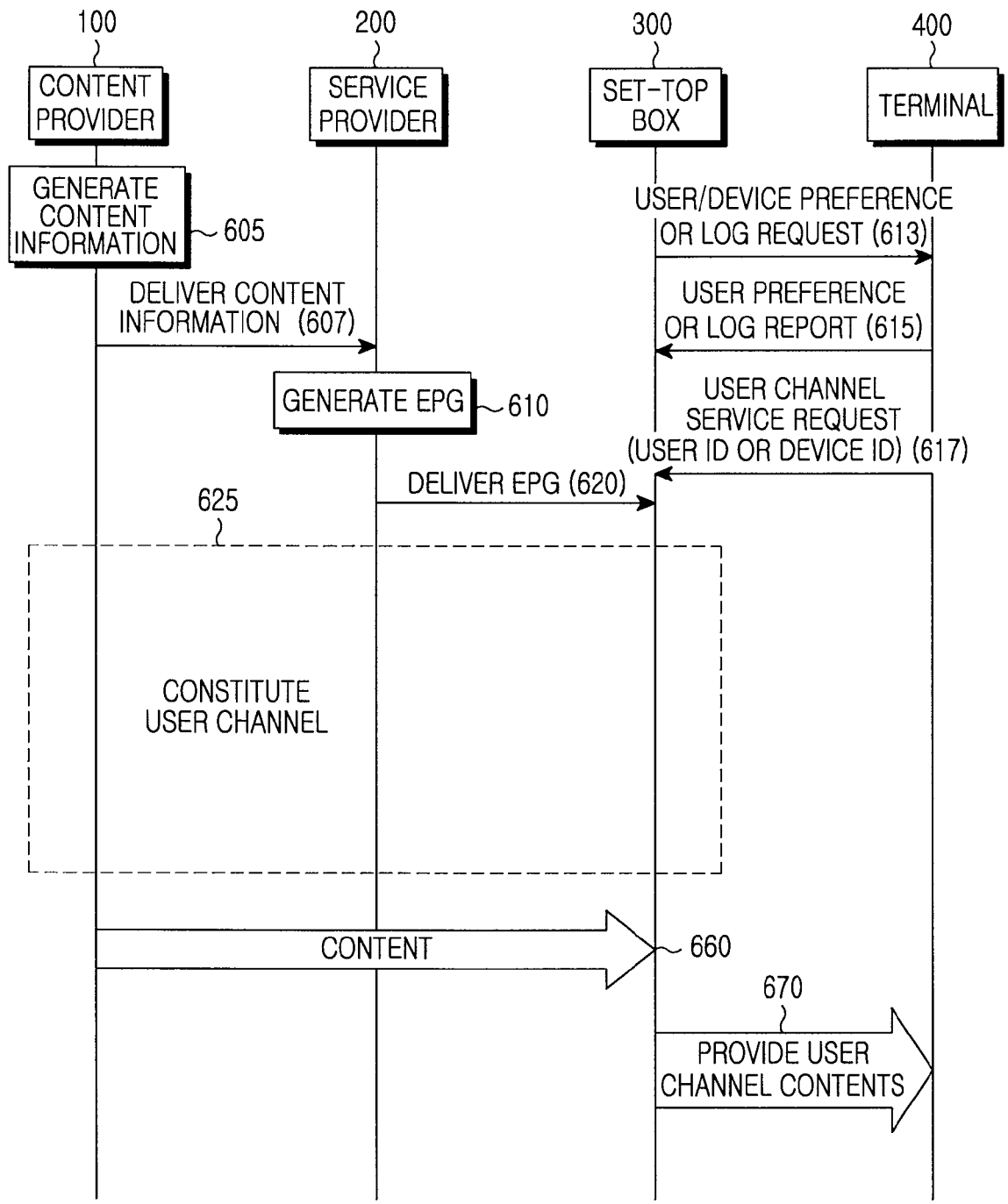
FIG. 6 is a flowchart illustrating a method of providing contents in accordance with an exemplary embodiment of the present invention.

FIG. 6 illustrates a method of providing contents according to an exemplary embodiment of the present invention.

In the content providing method illustrated in FIG. 6, it is assumed that a content providing apparatus for constituting a user channel is located in a home IPTV set, that is, the set-top box 300, and that the set-top box 300 constitutes the user channel.

Referring to FIG. 6, in step 605, the content provider 100 generates information on content to be provided (content information). In step 607, the content provider 100 delivers the generated content information to the service provider 200. The service provider 200 generates an EPG for IPTV services, based on the delivered content information, in step 610, and delivers the generated EPG to the set-top box 300 in step 620. The set-top box 300 detects content consumption behaviors according to users or terminals through interaction with the terminal 400 in steps 615 and 617. In an exemplary implementation, steps 613, 615 and 617 are performed before the set-top box 300 receives the generated EPG. However, they could also be performed after receipt of the EPG.

In step 613, the set-top box 300 transmits a request for user preferences or terminal preferences to the terminal 400. In step 615, the terminal 400 delivers information indicating the preferences for contents corresponding to a user or terminal ID to the set-top box 300. Subsequently, upon receiving user input requesting a user channel, the terminal 400 transmits a service request message including a user ID or a terminal ID to the set-top box 300 in step 617. Thereupon, in response to the service request message for a user channel, the set-top box 300 constitutes a user channel, which indicates what content is to be transmitted to the user and the time of its transmission, based on the received EPG in step 625.

Also, if real-time content is transmitted from the content provider 100 in step 660, the set-top box 300 transmits content to the terminal 400 according to the constituted user channel in step 670. With regard to this, the step of transmitting the real-time content is a step that continues subsequent to step 620.

Figure 7:
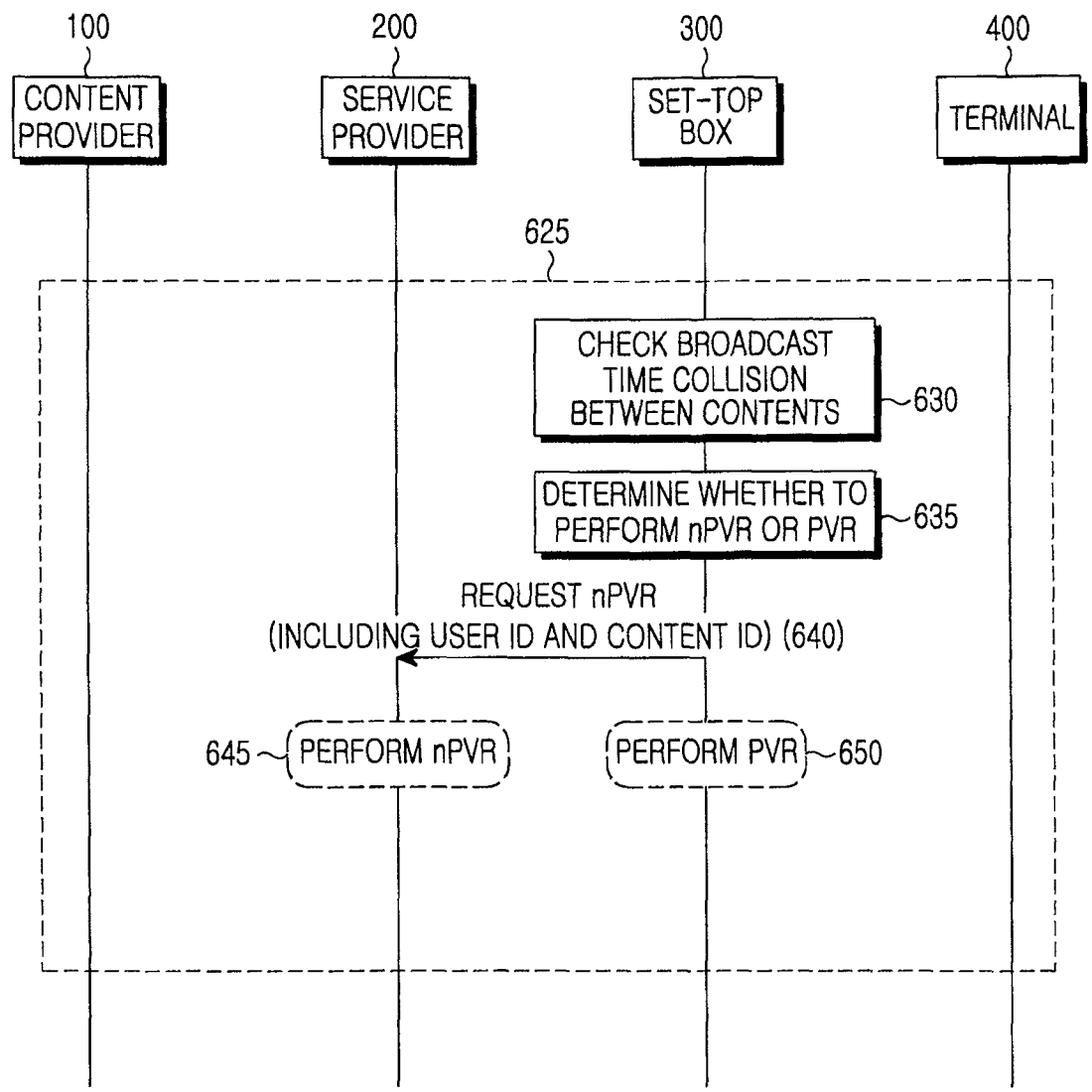
FIG. 7 is a flowchart illustrating a procedure of constituting a user channel according to an exemplary embodiment of the present invention.

FIG. 7 is a flowchart illustrating a procedure of constituting a user channel according to an exemplary embodiment of the present invention.

Referring to FIG. 7, in step 630, the set-top box 300 identifies broadcast times of contents corresponding to the user preferences, based on the received EPG, and determines if there are contents overlapping with each other. In step 635, the set-top box 300 determines whether content overlapping, even partially, with other content, is subjected to PVR in the local storage 340 or is subjected to nPVR for storage on the network.

When overlapping content is determined to be subjected to nPVR for storage on the network, the set-top box 300 delivers a message requesting that the corresponding content be recorded and includes a user ID and a content ID to the service provider 200 in step 640. Upon receiving the message requesting that the overlapping content be recorded, in step 645, the service provider 200 performs nPVR of the overlapping content in the storage on the network when the overlapping content is transmitted later.

In contrast, when the overlapping content is determined to be subjected to PVR and stored in local storage 340, in step 650, the set-top box 300 performs PVR of the overlapping content in the local storage 340 when the overlapping content is transmitted later. With regard to this, the content subjected to nPVR or PVR from among overlapping contents is content, the broadcast time of which is later than that of content overlapping therewith.

In FIG. 6, steps 645 and 650 are designated by a dotted line because their performance depends on the result of step 635.

Figure 8:
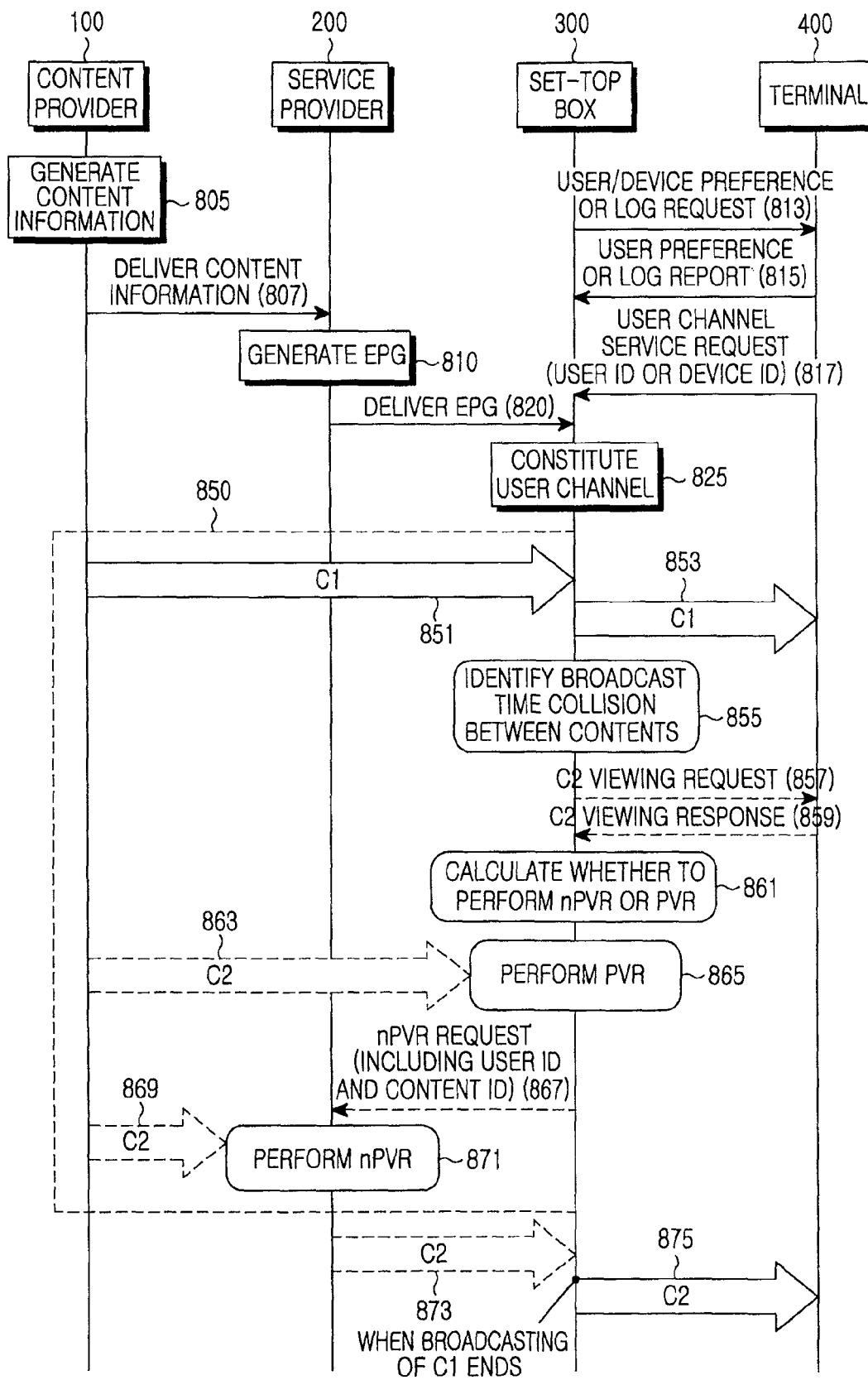
FIG. 8 is a flowchart illustrating a method of providing contents in accordance with an exemplary embodiment of the present invention.

FIG. 8 illustrates a method of providing contents according to an exemplary embodiment of the present invention.

The content providing method according to this exemplary embodiment, illustrated in FIG. 8, corresponds to a case where a user channel is reconstituted during viewing of the user channel. For example, such a case may occur when the broadcast time of one content lengthens in contrast with the existing schedule during real-time broadcasting.

In the exemplary embodiment of FIG. 8, currently broadcast content is defined by C1, and content that begins before the broadcasting of C1 ends is defined by C2.

Referring to FIG. 8, steps 805 to 825 are substantially the same processes as those described above in steps 605 to 625 of FIG. 6. That is, similar to step 625, in step 825, the set-top box 300 constitutes a user channel, which indicates when and which content is to be transmitted to a user, based on an EPG delivered from step 820 and a service request for a user channel, delivered from step 817.

In step 850, the content provider 100 broadcasts real-time content to the set-top box 300 through the service provider 200.

More specially, in step 850, the content provider 100 transmits C1, included in the user channel constituted in step 825, from among a number of contents to be broadcasted in step 851. In step 853, the set-top box 300 transmits C1 to the terminal 400 according to the constituted user channel.

In step 855, the set-top box 300 determines if C2, included in the constituted user channel, falls within the broadcast window of C1. That is, if broadcast time collision between contents occurs. When C2 falls within the broadcast window of C1, in step 857, the set-top box 300 informs the terminal 400 of the beginning of C2, and transmits a C2 viewing request message, which inquires if the terminal 400 wishes to stop current viewing of C1 and begin viewing of C2, to the terminal 400. When the terminal 400 transmits a C2 viewing response message, which informs the set-top box 300 that the terminal 400 will view C2 later on, to the set-top box 300 in response to the C2 viewing request message, the set-top box 300 proceeds to step 861. With regard to this, steps 857 and 859 may be omitted, that is, the set-top box 300 may proceed directly to step 861 without transmitting/receiving the C2 viewing request message/C2 viewing response message according to the initial setting of the terminal 400.

In step 861, the set-top box 300 performs a series of calculations to automatically determine whether to record C2 in an nPVR storage or a PVR local storage. In step 863, C2 begins to be broadcasted, and the set-top box 300 receives C2 transmitted from the content provider 100.

In step 865, the set-top box 300 records C2 in the PVR local storage. Upon performing nPVR of C2, the set-top box 300 transmits an nPVR request including a user ID and a content ID to the service provider 200 in step 867. In step 869, the content provider 100 transmits C2 to the service provider 200 at the same time as the beginning of broadcasting of C2. Also, in step 871, the service provider 200 performs nPVR of C2.

On performing nPVR of C2, the service provider 200 transmits nPVR-processed C2 to the set-top box 300 in step 873.

Upon receiving the nPVR-processed C2, in step 875, the set-top box 300 transmits C2 to the terminal 400 when broadcasting of C1 ends.

Steps 865 to 873 as described above may be included or omitted depending on the result of step 861.

Figure 9:
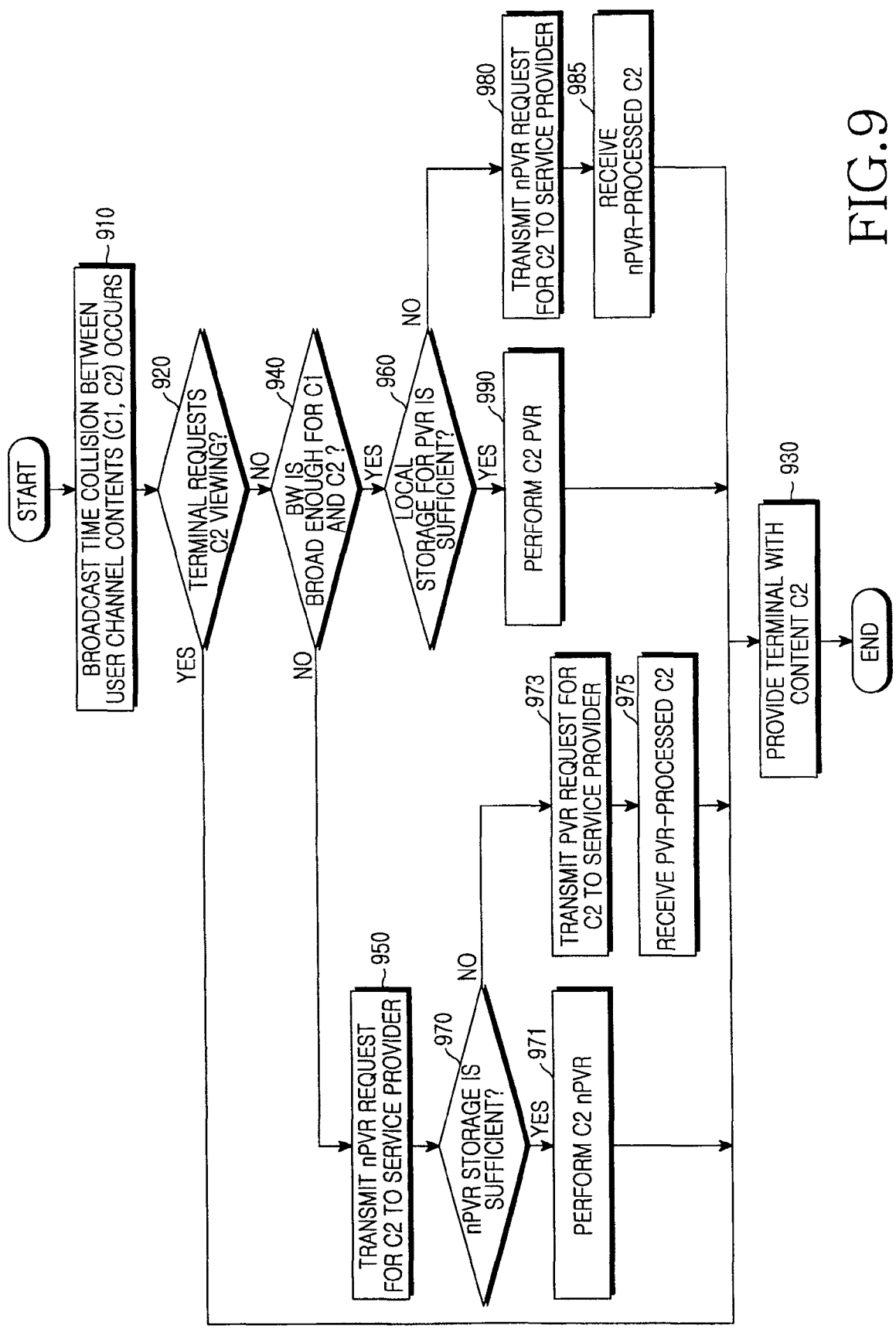
FIG. 9 is a flowchart illustrating steps 855 to 875 of FIG. 8 according to an exemplary embodiment of the present invention.

FIG. 9 is a flowchart illustrating steps 855 to 875 according to an exemplary embodiment of the present invention.

When broadcast time collision between contents C1 and C2 occurs in step 910, the set-top box 300 determines in step 920 if the terminal 400 desires to view C2 at that time. If it is determined that the terminal 400 desires to view C2 immediately, the set-top box 300 proceeds to step 930. Otherwise, the set-top box 300 proceeds to step 940.

In step 930, the set-top box 300 stops broadcasting of C1 and transmits C2 to the terminal 400.

In contrast, in step 940, the set-top box 300 determines if a wireless BandWidth (BW) is sufficient to transmit contents of both C1 and C2. When the wireless BW is sufficient, the set-top box 300 determines in step 960 if the local storage 340 within the set-top box 300 is sufficient to record C2. When the local storage 340 within the set-top box 300 is sufficient to record C2, the set-top box 300 performs PVR of C2 in step 990. In contrast, when the local storage 340 within the set-top box 300 is not sufficient to record C2, in step 980, the set-top box 300 transmits an nPVR request for C2 to the service provider 200, and the service provider 200 stores contents C2. The set-top box 300 receives nPVR-processed C2 from the service provider 200 in step 985, and then provides the terminal 400 with content C2 in step 930.

However, when the wireless BW is insufficient to transmit contents of both C1 and C2 in step 940, the set-top box 300 transmits an nPVR request to the service provider 200 in step 950. Also, the set-top box 300 determines in step 970 if the capacity of the nPVR storage is sufficient to record C2. When the capacity of the nPVR storage is sufficient to record C2, the set-top box 300 proceeds to step 971, performs nPVR of C2, and then transmits content C2 to the terminal 400 in step 930. In contrast, when the capacity of the nPVR storage is not sufficient to record C2, the set-top box 300 transmits a PVR request for C2 to the service provider 200 in step 973, receives PVR-processed C2 in step 975, and then transmits content C2 to the terminal 400 in step 930.

Figure 10:
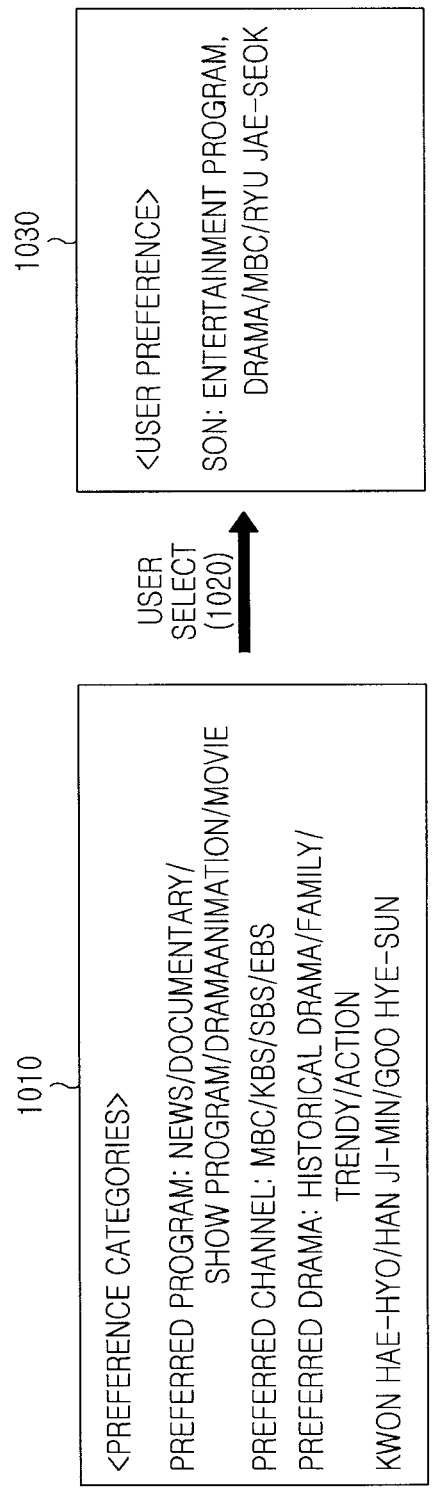
FIG. 10 is a view illustrating an example of information provided to a user in order to detect user preference for contents and information selected by the user in accordance with an exemplary embodiment of the present invention.

FIG. 10 illustrates an example of information provided to a user in order to detect user preference for contents and information selected by the user according to an exemplary embodiment of the present invention.

Reference numeral "1010" designates a screen that is displayed in order for a user to select his/her preference according to program genres, preferred channels, preferred entertainers, and so forth.

If a user(s) select(s) entertainment program, drama, MBC, and Ryu Jae-Seok (designated by reference numeral "1020") through the screen 1010, entertainment program, drama, MBC, and Ryu Jae-Seok are stored as user preference as illustrated on screen 1030.

Figure 11:
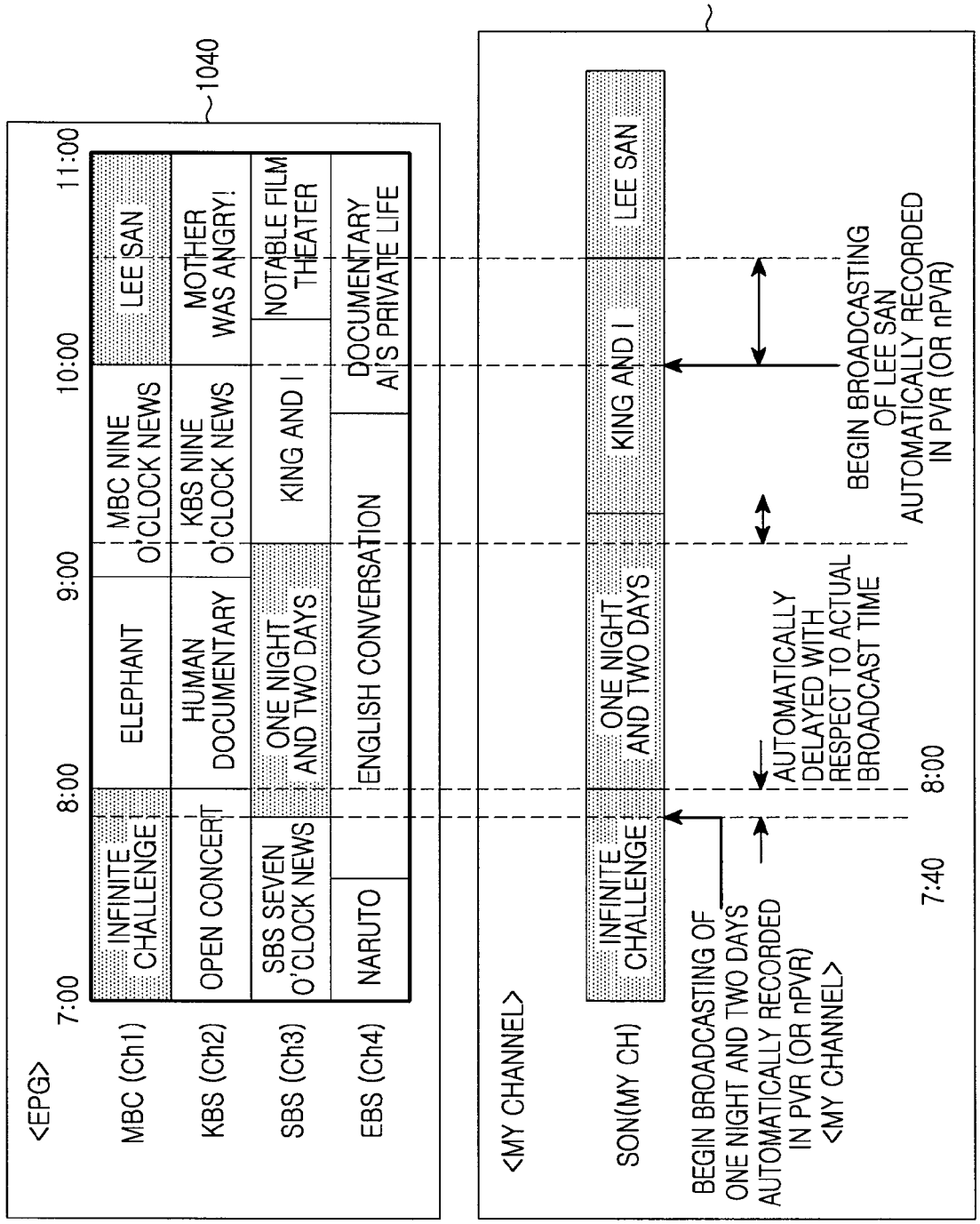
FIG. 11 is a view illustrating a user channel constituted from a received EPG in accordance with an exemplary embodiment of the present invention.

FIG. 11 is a view illustrating a user channel constituted from a received EPG according to an exemplary embodiment of the present invention.

Referring to FIG. 11, reference numeral "1040" designates an example of an EPG in which content information is presented according to time and channels, and reference numeral "1050" designates a user channel constituted according to the user preference selected in FIG. 10. When the broadcast times of the selected program contents overlap with each other, the set-top box 300 can automatically determine whether the overlapping contents are subjected to PVR or nPVR, automatically record the overlapping contents in the PVR local storage or nPVR storage, and then automatically provide the terminal 400 with broadcasting of a currently broadcasted content when broadcasting of a previous content ends.

Although a user's preferred contents are provided through the terminal 400 in the exemplary embodiments as described above, the user's preferred contents may be provided to the terminal 400 through the service provider 200, as will be described below in another exemplary embodiment of the present invention.

Figure 12:
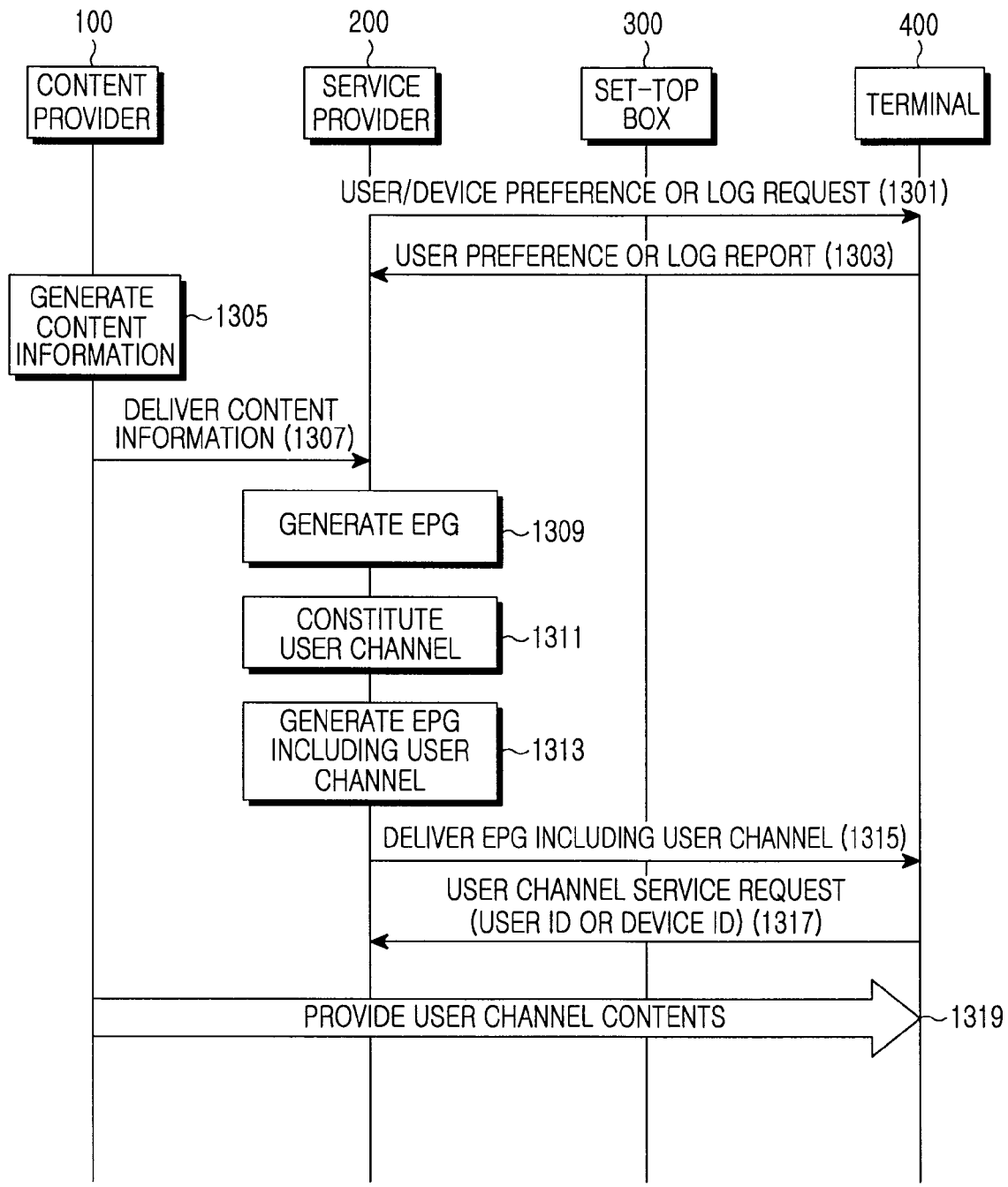
FIG. 12 is a flowchart illustrating a method of providing contents in accordance with an exemplary embodiment of the present invention.

FIG. 12 illustrates a method of providing contents according to an exemplary embodiment of the present invention.

The exemplary embodiment of the present invention, illustrated in FIG. 12, corresponds to a case where the content providing apparatus 2000 for a user channel exists on the provider network of a service provider, and the service provider constitutes a user channel and transmits an EPG including the user channel to the terminal 400.

Referring to FIG. 12, in step 1301, the service provider 200 requests the terminal to transmit a log of the user's viewing history through the terminal 400 or the user's viewing preferences. In step 1303, the terminal 400 transmits the user's viewing log or the user's viewing preferences to the service provider 200.

Steps 1305 to 1309 correspond to steps 605 to 610 of the previous exemplary embodiment of the present invention. That is, the content provider 100 generates content information in step 1305, and delivers the generated content information to the service provider 200. Also, in step 1309, the service provider 200 generates an EPG, based on the delivered content information.

In step 1311, the service provider 200 constitutes a user channel, based on information on each program in the generated EPG (e.g. time information, genre, etc.) and the user preference information received from step 1303. As an example, the service provider constitutes a user channel, which indicates when and which content is transmitted to the user, in substantially the same manner as in step 625 or steps 825 to 971 of the previous exemplary embodiments of the present invention. The service provider 200 generates a new EPG by combining the generated EPG with the constituted user channel in step 1313, and transmits the generated new EPG to the terminal 400 via the set-top box 300 in step 1315. Thus, the terminal 400 can provide the user with the new EPG including the constituted user channel.

In step 1317, the terminal transmits a request for a user channel service to the service provider 200 at the request of the user. In response to this request, the content provider 100 and the service provider 200 transmit content corresponding to the requested user channel service to the terminal 400 in step 1319, thereby enabling the user to view the content.

As described above, exemplary embodiments of the present invention provide a user with a service that makes it possible for the user to continuously view his/her desired contents without needing to search for and tune channels, thereby allowing the user to enjoy more convenient user-oriented Internet protocol broadcasting, and making it possible for a provider to create profit by providing such a service.

While the invention has been shown and described with reference to certain exemplary embodiments thereof, it will be understood by those skilled in the art that various changes in form and details may be made therein without departing from the spirit and scope of the invention as defined by the appended claims and equivalents thereof.

What is claimed is:

1. A method of providing contents in an internet broadcasting system, the method comprising:

generating a content guide for a personalized channel based on a user preference;

determining whether overlapped content items are detected based on the content guide; and if the overlapped content items are detected, deciding a location to record at least one of overlapped contents, based on one of a storage status and a network bandwidth for transferring the overlapped content items at the same time.

2. The method of claim 1, wherein the deciding of the location comprises deciding one of a Private Video Recording (PVR) and a non Private Video Recording (nPVR) for recording of at least one of the overlapped contents, and wherein the PVR is recording for storing contents at a user's location and the nPVR is recording for storing contents remote from the user's location.

3. The method of claim 2, further comprising:

if the PVR is decided, performing recording of the overlapped contents; and if the nPVR is decided, transmitting, to a service provider, a request for performing recording of the overlapped contents.

4. The method of claim 3, wherein the request comprises one of a service identifier (ID) and a content ID for the overlapped contents.

5. The method of claim 3, further comprising:

receiving, from the service provider, recording information of the overlapped contents; and updating the content guide according to the recording information of the overlapped contents.

6. The method of claim 1, wherein a content desired to view by a user of the overlapped contents is broadcasted, and at least one content different from the content among the overlapped contents is recorded.

7. A method of receiving contents by a mobile terminal, the method comprising:

receiving content items according to a content guide for a personalized channel generated based on a user preference, wherein, if overlapped content items are detected based on the content guide, a location to record overlapped contents is decided, based on one of a storage status and a network bandwidth for transferring the overlapped content items at the same time.

8. The method of claim 7, wherein the location to record the overlapped contents comprises one of a Private Video Recording (PVR) and a non Private Video Recording (nPVR), and wherein the PVR is recording for storing contents at a user's location and the nPVR is recording for storing contents remote from the user's location.

9. The method of claim 8, wherein, if the PVR is decided, recording of the overlapped contents is performed, and if the nPVR is decided, a request for performing recording of the overlapped contents is transmitted to a service provider.

10. The method of claim 9, wherein the request comprises one of a service identifier (ID) and a content ID for the overlapped contents.

11. The method of claim 9, further comprising:

if the content guide is updated according to recording information of the overlapped contents, receiving contents according to the updated content guide.

12. The method of claim 7, wherein a content desired to view by a user of the overlapped contents is broadcasted, and at least one content different from the content among the overlapped contents is recorded.

13. An internet broadcasting system for providing contents, the internet broadcasting system comprising:

a memory for recording the contents;

a transmitter for transmitting the contents; and a controller for generating a content guide for a personalized channel based on a user preference, determining whether overlapped content items are detected based on the content guide, and if the overlapped content items are detected, deciding a location to record at least one of overlapped contents, based on one of a storage status and a network bandwidth for transferring the overlapped content items at the same time.

14. The internet broadcasting system of claim 13, wherein the controller decides one of a Private Video Recording (PVR) and a non Private Video Recording (nPVR) for recording of at least one of the overlapped contents, and wherein the PVR is recording for storing contents at a user's location and the nPVR is recording for storing contents remote from the user's location.

15. The internet broadcasting system of claim 13, wherein the controller, if the PVR is decided, performs recording of the overlapped contents, and if the nPVR is decided, controls the transmitter for transmitting, to a service provider, a request for performing recording of the overlapped contents.

16. The internet broadcasting system of claim 15, the request comprises one of a service identifier (ID) and a content ID for the overlapped contents.

17. The internet broadcasting system of claim 15, further comprising a receiver for receiving, from the service provider, recording information of the overlapped contents, and the content guide being updated according to the recording information of the overlapped contents.

18. The internet broadcasting system of claim 13, wherein a content desired to view by a user of the overlapped contents is broadcasted, and at least one content different from the content among the overlapped contents is recorded.

19. A mobile terminal for receiving contents, the mobile terminal comprising:

a receiver for receiving content items according to a content guide for a personalized channel generated based on a user preference, wherein, if overlapped content items are detected based on the content guide, a location to record overlapped contents is decided, based on one of a storage status and a network bandwidth for transferring the overlapped content items at the same time.

20. The mobile terminal of claim 19, wherein the location to record the overlapped contents comprises one of a Private Video Recording (PVR) and a non Private Video Recording (nPVR), and wherein the PVR is recording for storing contents at a user's location and the nPVR is recording for storing contents remote from the user's location.

21. The mobile terminal of claim 20, wherein, if the PVR is decided, recording of the overlapped contents is performed, and if the nPVR is decided, a request for performing recording of the overlapped contents is transmitted to a service provider.

22. The mobile terminal of claim 21, wherein the request comprises one of a service identifier (ID) and a content ID for the overlapped contents.

23. The mobile terminal of claim 21, wherein the receiver, if the content guide is updated according to recording information of the overlapped contents, receives contents according to the updated content guide.

24. The mobile terminal of claim 19, wherein a content desired to view by a user of the overlapped contents is broadcasted, and at least one content different from the content among the overlapped contents is recorded.

* * * * *